March 5, 1935.  G. O. WARDROP  1,993,078
AUTOMATIC PHONOGRAPH
Filed April 3, 1931    6 Sheets-Sheet 1

Inventor
Grover O. Wardrop
By W E Beatty
Atty.

March 5, 1935.  G. O. WARDROP  1,993,078
AUTOMATIC PHONOGRAPH
Filed April 3, 1931  6 Sheets-Sheet 2
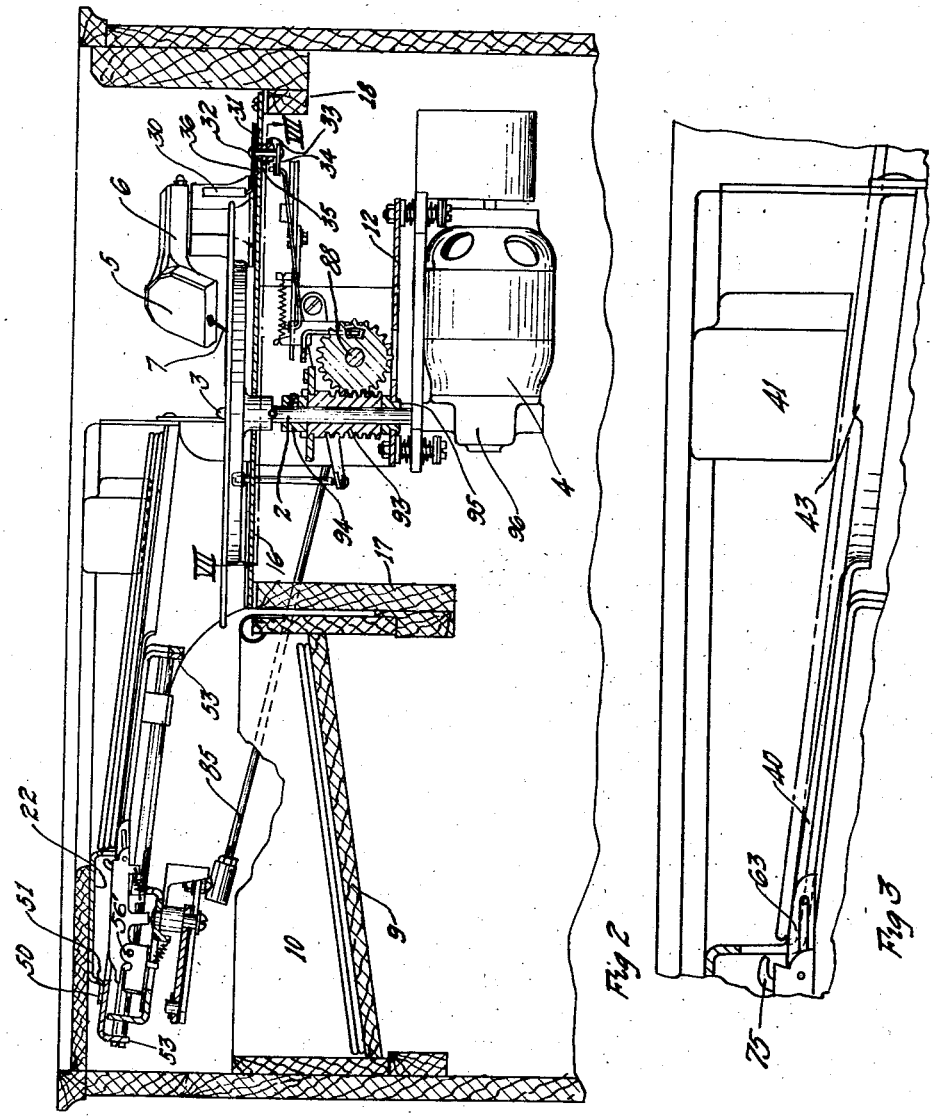
Inventor
Grover O. Wardrop
By W E Beatty
Atty.

March 5, 1935.  G. O. WARDROP  1,993,078
AUTOMATIC PHONOGRAPH
Filed April 3, 1931   6 Sheets-Sheet 3
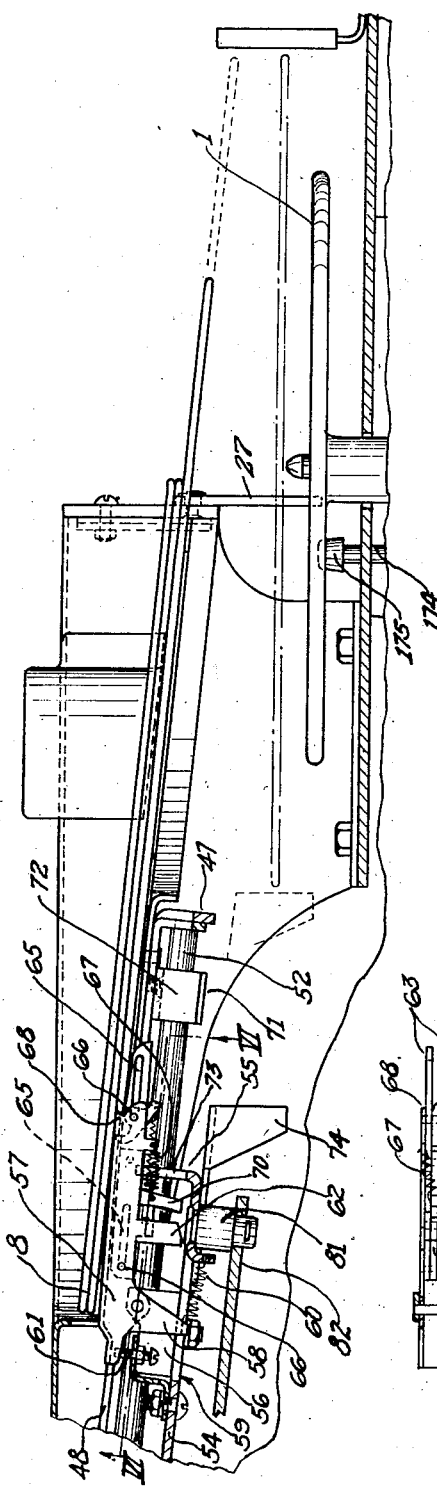
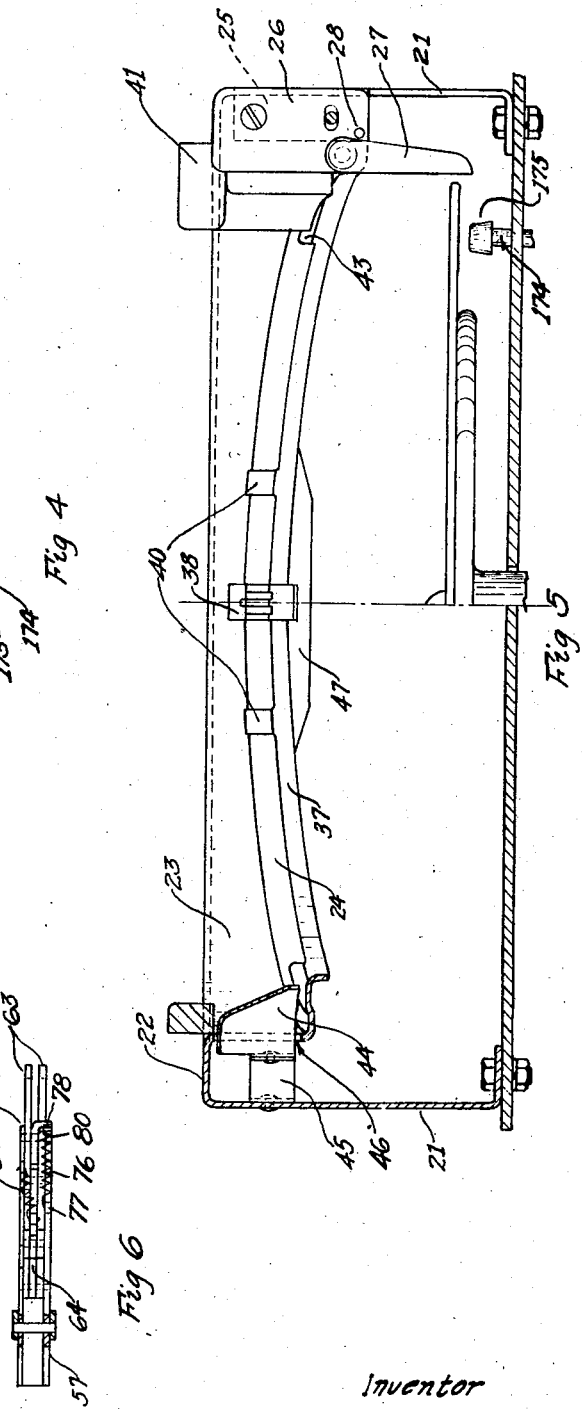
Inventor
Grover O. Wardrop
By W. R. Beatty
Atty.

March 5, 1935. G. O. WARDROP 1,993,078
AUTOMATIC PHONOGRAPH
Filed April 3, 1931 6 Sheets-Sheet 4

Inventor
Grover O. Wardrop
By W E Beatty
Atty

March 5, 1935.　　　G. O. WARDROP　　　1,993,078
AUTOMATIC PHONOGRAPH
Filed April 3, 1931　　　6 Sheets-Sheet 5

Inventor
Grover O Wardrop
By W. R. Beatty
Atty.

March 5, 1935.  G. O. WARDROP  1,993,078
AUTOMATIC PHONOGRAPH
Filed April 3, 1931   6 Sheets-Sheet 6

Inventor
Grover O. Wardrop
By W E Beatty
Atty.

Patented Mar. 5, 1935

1,993,078

UNITED STATES PATENT OFFICE 1,993,078

AUTOMATIC PHONOGRAPH

Grover O. Wardrop, Muskegon Township, Muskegon County, Mich., assignor to United Research Corporation, a corporation of Delaware Application April 3, 1931, Serial No. 527,453

20 Claims. (Cl. 274—10)

My invention relates to phonographs and has a special relation to automatic or multi-record phonographs.

One object of my invention is to provide an automatic phonograph of the type in which the lowermost record in a stack is fed onto a turn table, with a separating device having opposed faces between which the selected record passes, the lower face having such relation to the other parts of the magazine as to constitute a support for the record irrespective of any irregularity in its shape whereby the proper feeding of warped or misshapen records is assured.

Another object is to provide an especially simple and easily constructed ejector for pushing a record out of a magazine of the type mentioned.

A further object is to provide guides for directing onto the turn table records dropped from the magazine, the guides being movable to permit the manual placing of a larger record on the turn table.

A further object is to provide a hopper for a magazine of the type mentioned which shall be especially simple, inexpensive to manufacture, strong and durable.

A further object is to provide an automatic control device operable after the playing of a record by the progression of the reproducer to a fixed point or its reversal of movement, which shall work according to mechanical principles and shall therefore be especially reliable and durable and which shall be especially simple and inexpensive to manufacture.

A further object is to provide devices operable from a single horizontal shaft for accomplishing the various movements required of the reproducer suspension arm of an automatic phonograph, the operation by such a shaft making possible the extreme simplification of such devices.

A still further object of my invention is to provide a phonograph in which various "automatic" operations are performed through the medium of a single horizontal slow speed shaft whereby the number of parts and their cost of manufacture are reduced to a minimum.

Other objects and advantages will appear as the description proceeds.

Referring to the accompanying drawings, Figure 1 is a plan view of a phonograph embodying my invention.

Fig. 2 is a sectional view taken along the line II—II of Fig. 1.

Fig. 3 is a diagrammatic view of a magazine hopper indicating by a dot-dash line the plane on which the lowermost record is supported.

Fig. 4 is a sectional view on enlarged scale taken on the same plane as Fig. 2, portions of the motor cover plate and portions of the hopper remote from the turn table being broken away, and the cabinet not being shown.

Fig. 5 is an enlarged sectional view taken on the line V—V of Fig. 1, portions below the motor cover plate being broken away and the cabinet not being shown.

Fig. 6 is a detail sectional view of a record ejector taken along the line VI—VI of Fig. 4.

Figure 1:
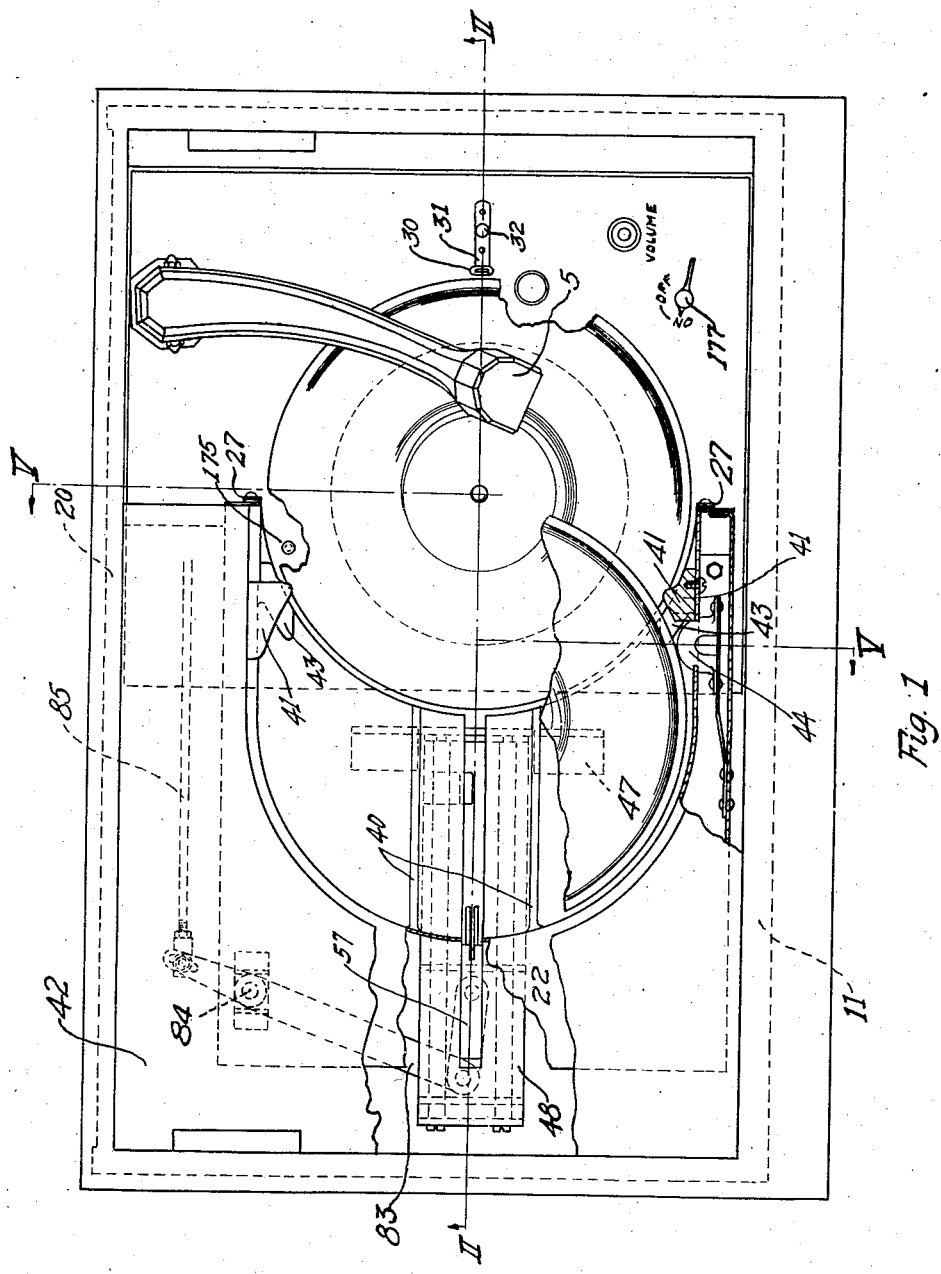
Figure 7:
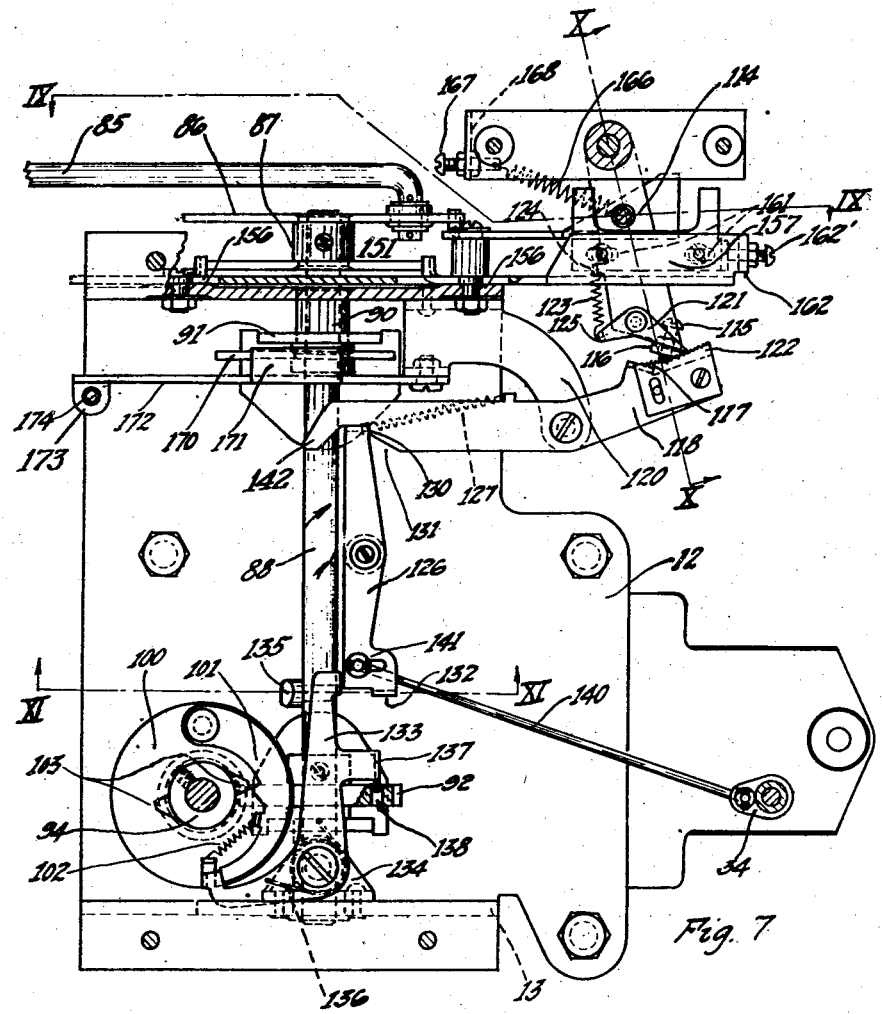
Fig. 7 is an enlarged sectional view taken along the line VII—VII of Fig. 2.

Referring more particularly to the drawings, the phonograph constituting the exemplary embodiment of the invention is of the type in which a plurality of records are played automatically in sequence. The phonograph in general comprises a turn table 1 on a drive shaft 2 which terminates at its upper end in a center pin 3, and an electric motor 4 for driving the shaft 2. A reproducer 5 on a suspension arm 6 is provided with a stylus 7.

The records 8 to be played are stacked in a magazine hopper whence they are transferred singly onto the turn table. With a record in position on the turn table the suspension arm 6 is swung over the record and then the reproducer 5 is lowered to present the stylus 7 in engagement with the record at the starting point adjacent the periphery. The stylus follows the sound groove in the record and conveys the reproducer inwardly until the playing of the record is completed. Thereupon the reproducer is elevated and the suspension arm is swung outwardly beyond the turn table to clear the record which is then discharged onto a shelf 9 constituting the bottom of a compartment 10. A new record from the magazine hopper is then pushed onto the turn table.

Access may be had to the compartment 10 through an opening, not shown, in the front 11 of the cabinet so that the records received therein may be removed and replaced in the magazine hopper.

Figure 8:
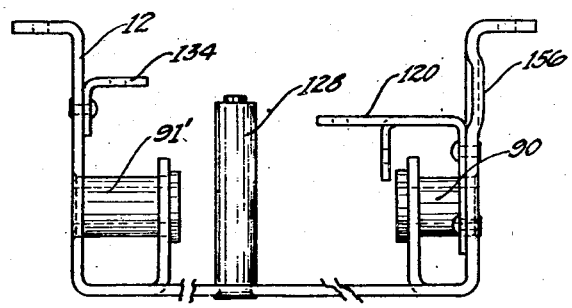
Fig. 8 is a detail and elevational view of a supporting frame for operating parts.

The operating mechanism of the phonograph is mounted on a frame 12 (Figs. 2, 7, 8 and 9) which as shown particularly in Fig. 8 is of "U" shape having upwardly extending supporting portions 13 and 14, each secured by a laterally direct flange 15 to a cover plate 16. The cover plate is mounted on supports 17 and 18 which extend from the rear wall 20 to the front 11 of the cabinet.

The magazine hopper (Fig. 1 to 5) comprises upstanding legs 21 which are rigidly mounted on the cover plate 16 and at their upper end extend inwardly defining a top 22, a hopper wall 23 extending from the top 22 to a hopper bottom 24. The hopper portions 21, 22, 23 and 24 are preferably formed of a single piece of sheet metal.

The hopper wall 23 is curved semicircularly at one end to conform to the shape of phonograph records and from this curved portion extends in vertical planes to diametrically opposite points with respect to a record positioned on the turn table. Adjacent these points the legs 21 of the hopper are provided with flanges 25 to which plates 26 are adjustably secured closing the space between the wall 23 and the legs 21.

Guides 27 are pivotally mounted on the plates 26, their movement in one direction being limited by stops 28 as shown in Fig. 5. When the guides are in the position illustrated in this figure they serve to center records dropping from the magazine hopper onto the turn table. The center pin 3 tends also to correctly center the falling records.

The guides 27 may be manually swung upwardly substantially above the level of the turn table to permit a record of larger diameter to be manually placed on the turn table. Another guide 30 for the descending record is also provided which has a flat base 31 resting upon the cover plate 16 and rigid with a shaft 32 extending through a bearing 33 on the cover plate and having at its lower end a crank 34 for purposes presently to be described. A compression spring engaging the crank tends to move it away from the cover plate 16 and teeth 36 on the base 31 are thus releasably retained in depressions in the cover plate 16. The guide 30 may, therefore, be manually swung away from the turn table to permit the placing of a larger record thereon.

The bottom 24 of the hopper inclines downwardly as it approaches the turn table and terminates in a depending semi-circular flange 37 of slightly greater radius than a record. Also the bottom is divided into two parts by a slot 38 which cuts through the flange 37 and extends upwardly to and through a part of the hopper wall 23. Spaced on each side of the slot 38 are a pair of raised portions 40 on which a portion of the lowermost record slides as it is ejected from the hopper.

Secured to the straight portions of the wall 23 are a pair of oppositely disposed record stops 41 which hold the stack of records 8 in the hopper. The stops project upwardly above the hopper wall 23 and engage the inner edge of a cover board 42 Fig. 1 which rests upon and covers the hopper top 22. The cover board is cut away to correspond to the shape of the hopper wall 23 and its thickness tends to increase substantially the depth of the hopper, the capacity of which corresponds substantially to the height of the stops 41.

The bottom face of the stops 41 are spaced slightly more than the thickness of a record from raised portions 43 in the bottom 24 of the hopper. Thus clearance is provided to permit the ejection of records onto the turn table.

The lowermost record in the hopper normally rests upon the raised portions 43 and those parts of raised portions 40 which are immediately adjacent the hopper wall 23. This is indicated diagrammatically in Fig. 3, the downward inclination of the bottom of the hopper being somewhat exaggerated in this showing to make clear the relation of parts. As shown in Fig. 1, the raised portions 43 are so located that the lowermost record when concentric with the hopper must rest on those parts of the raised portions 40 which are immediately adjacent the hopper wall 23. The center of gravity of such a record will be between said parts and a line connecting the raised portions 43. If the bottom were perfectly flat, many warped records could not be pushed underneath the record stops 41 as the leading edge of the record would engage the stops but with the described arrangement even badly warped records may be handled without failure.

When there is only a single record in the hopper it is prevented from sliding underneath the stops by means of a retarder 44 which is mounted by means of a leaf spring 45 on one of the legs 21 and extends through an aperture 46 in the hopper wall 23 so as to yieldingly oppose the movement of a record out of the hopper.

An angle strip 47 extends across the bottom 24 of the hopper underneath and is riveted in place, serving as a reinforcement. Similarly a reinforcing plate 48 is riveted to the hopper bottom and extends upwardly beyond the end of the hopper where it is also supported by an ear 50 (Fig. 2) on a flange 51 which depends from the hopper top 22. A pair of guide rods 52 extend between and are secured to downwardly directed flanges 53 on the reinforcing plate.

Referring now to the operating mechanism and firstly to devices for ejecting records from the hopper, a carrier 54 (Figs. 1, 2, 4, 5 and 6) has upturned ends 55 slidably supported on the guide rods 52. A mounting 56, on the carrier has in cross section the shape of an inverted U and is provided with spaced ears 56' (Fig. 2) between which is pivoted the depending sides of an ejector 57 which also has in cross section the shape of an inverted U. An arm 58 on the ejector extends downwardly through an opening 59 in the carrier 54 and is connected to the carrier by a tension spring 60 which tends to hold the ejector in elevated position. The upward movement of the ejector is limited by its engagement with a screw 61 threaded through the transverse portion of the mounting 56 and accessible for adjustment through the opening 59. A stop 62 on the ejector limits its downward movement by engaging the carrier 54.

A gauge for the ejector 57 comprises a pair of plates 63 having a spacer 64 therebetween. The gauge is provided with longitudinal slots 65 through which pins 66 on the ejector extend, thus supporting the gauge for sliding movement. A tension spring 67 secured to the ejector and the gauge, tends to maintain the latter in extended relation to the former, Fig. 2 indicates the relation of parts prior to the ejecting of a record. As shown the gauge is in contact with the bottom record so that as the carrier moves under the hopper a pair of teeth 68 on the ejector 57 engage the edge of this record and slide it downwardly. When the ejector approaches the open end of the hopper a lug 70 on the gauge abuts against a laterally projecting flange 71 on a stop 72 which depends from the bottom of the hopper. The front end 55 of the carrier is cut away at 73 so that it may pass beyond the stop 72. After the movement of the gauge is thus checked the ejector travels forwardly to the end of the hopper bottom at which point the gauge is entirely withdrawn within the ejector and the record is free to drop down from the dotted line position thereof (Fig. 4).

A guide 74 on the carrier 54 is at this time in the dotted line position shown in Fig. 4 wherein it is in cooperative relation with guides 27 and 30 for directing the falling record onto the turn table.

When but a single record remains in the hopper it is necessary to prevent it from tipping out of engagement with the ejector during the feeding movement and a catch 75 (Fig. 2) is therefore provided, pivoted on a pin 66 on the ejector and normally extending upwardly above the end of the ejector (Fig. 2) in position to receive and hold the edge of the record. A tension spring 76 extending between a lug 77 on the ejector and a lug 78 on the catch tends to swing the catch 75 upwardly and forwardly to a limit determined by the engagement of the lug 78 with another lug 80 on the ejector.

When there are several records in the hopper the catch 75 in the feeding operation is forced backwardly to the position shown in Fig. 4 by the weight of the records above the one being ejected.

For reciprocating the carrier 54 a stud 81 thereon is connected by a link 82 (Figs. 1, 2 and 4) to a rock lever 83 pivoted at 84 (Fig. 1) under the hopper top 22. Another link 85 has at one end a universal connection with the rock lever 83 and its other end is journaled in a cam member 86 (Figs. 2, 7 and 9) from which it is manually removable.

The cam member 86 is secured by a sleeve 87 to a horizontal shaft 88 which is supported adjacent one end by a bearing 90 fixed between the upwardly extending portion 14 of the frame 12 and an ear 91 struck up from the bottom portion of the frame. The other end of the shaft 88 is journaled in a bearing 91 on the upwardly extending portion 13 of the frame 12.

A worm gear 92 (Figs. 7 and 9) fixed on the shaft 88 meshes with a worm 93 which is freely mounted on the drive shaft 2 but prevented from longitudinal movement by a collar 94 fixed on the drive shaft and a bearing 95 on the frame 12 in which the drive shaft is journaled.

The drive shaft 2 is connected by a gear reduction 96 to the motor 4 which is supported by means of bolts 97 on the frame 12, a spring mounting 98 being provided to check vibration.

A disc 100 secured to the worm 93 has a clutch dog 101 pivoted thereon which a spring 102 tends to throw into engagement with clutch teeth 103 on the collar 94.

The clutch is thrown "in" by means of a control device actuable by the movement of the reproducer 5 after the playing of a record.

The suspension arm 6 is substantially of inverted U shape in cross section and is mounted on a pivot 104 extending through upstanding ears 105 on a base 106. A shaft 107 to which the base is secured, is journaled in a bearing 108 which extends through an opening 110 in the cover plate 16. The bearing 108 is secured to a support 111 which is mounted underneath the cover plate by means of screws 112, rubber washers 113 engaging the cover plate to prevent the transmission of vibrations from the motor drive to the suspension arm.

An arm 114 is secured to the lower end of shaft 107 and therefore is removable in unison with the suspension arm during the playing of a record. If the record being played is not provided with an "eccentric groove" for imparting a return movement to the reproducer 5, the suspension arm will continue to move inwardly after the record is played and will bring a screw 115 extending through a lug 116 on the arm 114 into engagement with a cam 117 on a control lever 118. The control lever 118 is thus movable about its pivot on a bracket 120 secured to the upstanding portion 14 of the supporting frame 12.

When the groove in the central area of the record is such as to impart a return movement to the suspension arm, the control lever 118 is actuated by a pawl 121 on the arm 114 which engages a ratchet 122 on the control lever 118.

During the progressive movement of the reproducer 5 in the playing of a record the pawl 121 rides over the teeth of the ratchet with which it is held in engagement by a tension spring 123 secured to the pawl 121 and a lug 124 on the arm 114. A lug 125 on the pawl is engageable with the arm 114 to prevent pivotal movement of the pawl into an inoperative position.

During the playing operation, the control member 118 is maintained in engagement with an actuator 126 by means of a tension spring 127 connecting the two members. A post 128 (Fig. 8) on the frame 12 pivotally supports the actuator which on the movement of the control member 118 is disengaged from a shoulder 130 thereon and under the action of the spring 127 moves along a cam face 131 on the control member thus disengaging the ratchet 122 from the pawl 121 and permitting free movement of the arm 114 and the reproducer 5 in an outward direction with respect to the turn table.

The referred to movement of the actuator brings a flange 132 thereon into engagement with one end of a lever 133 which is pivoted on a bracket 134 and during the playing operation has its other end in engagement with the clutch dog 101 thus holding the latter in inoperative position. The lever 133 is thus swung to disengage the clutch dog which is then engaged with the rotating clutch teeth 103 thereby causing the rotation of the worm 93, the worm gear 92 and shaft 88.

The shaft 88 has a cam 135 thereon which moves against the flange 132 on the actuator 126 and restores the latter to locked relation with the control member 118.

A spring 136 acting between the bracket 134 and the lever 133 tends to throw the latter into engagement with the clutch dog 101 for disengaging it from a clutch tooth 103 but after the shaft 88 begins to move, the lever 133 is held away from the clutch dog 101 by an arm 137 on the lever which rides along the face of the worm gear 92. After one complete revolution of the shaft 88, the arm 137 under the action of the spring 136 is permitted to move into a hole 138 in the worm gear 92 and thus the clutch is disengaged. It should be noted that the spring 136 is not of sufficient strength to overcome the action of the spring 127 in moving the actuator and the lever 133.

If it be desired to render the control device inoperative to throw "in" the clutch so that the machine will operate as an ordinary phonograph for the manual playing of a single record, the operator may move the stop 30 (Fig. 2) and thereby turn the shaft 33 through an angular distance of 180°. The crank 34 is thus moved from the position shown in Fig. 7 and a link 140 which has a lost motion connection 141 with the actuator 126 swings the latter in a counter clockwise direction causing one end to engage and ride along a cam 142 on the control member 118. The ratchet 122 and the cam 117 are thus drawn away from their cooperating parts on the arm 114 so that the suspension arm will have free movement in either direction. The actuator 126 will be held in this inoperative position by the teeth 36 on the guide base 31 which enter the depressions in the cover plate 16.

In the operation of the machine as an automatic phonograph, when the clutch is thrown "in" and the shaft 88 begins to rotate, the suspension arm 6 is first lifted to permit the discharge of a played record. This is accomplished by the movement of the cam 86 on the shaft 88 which rocks a lever 144 pivoted on a fixed stud 145. The lever 144 has a flange 146 on which rests a rod 147 slidably mounted in a hole 148 in the suspension arm base 106 and having a head at its upper end which engages the suspension arm. A compression spring 150 disposed between the head and the base reduces to the desired degree the weight of the reproducer on the record during the playing operation. The described movement of the lever 144 is communicated to the rod 147 and thence to the suspension arm 6.

In order that the played record, may in a manner presently to be described, be discharged from the turn table, the suspension arm is next swung laterally by means of a cam 151 on the shaft 88 which actuates a slide 152 having follower portions 153 engagable with the cam 151. The slide 152 has slots 154 therein through which project the stud 145 and a stud 155. The slide 152 is guided between heads on the studs and bosses 156 formed in the upstanding portions 14 of the frame 12. A flange 157 on the slide has a plate 158 adjustably mounted thereon by means of set screws 160 extending through slots 161 in the plate and a lug 162 depending from the flange has an adjustment screw 162' extending there through and engaging an ear 163 projecting downwardly from the plate whereby the position of the plate may be varied. The movement of the cam 151 causes an arm 164 on the plate 158 to engage the rod 147 and thereby move the base 106 and the suspendion arm 6. During this movement of the suspension arm it is also maintained in elevated position by the rod 147 which slides along the surface of the flange 146 on the lever 144.

Before the reproducer reaches its outermost position the record is discharged in a manner presently to be described and when the reproducer ceases its movement another record is dropped onto the turn table in a manner previously describer. The reproducer dwells in this position while the cam 151 reverses the movement of the slide 152 and brings another arm 165 on the plate 158 into engagement with the rod 147. The movement of the suspension arm is then reversed and it travels inwardly till the stylus 7 is above the edge of the record.

The cam 86 then operates through the lever 144 and the rod 147 to lower the suspension arm 6 and the stylus is deposited on the smooth peripheral portion of the record. A tension spring 166 (Fig. 7) extending between the rod 147 and an adjustment screw 167 in a flange 168 on the support 111, then draws the suspension arm further inwardly till the stylus reaches the sound groove.

The spring 166 does not have sufficient force to move the suspension arm 6 before the stylus engages the record as the flange 146 is maintained at a slight inclination.

Figure 9:
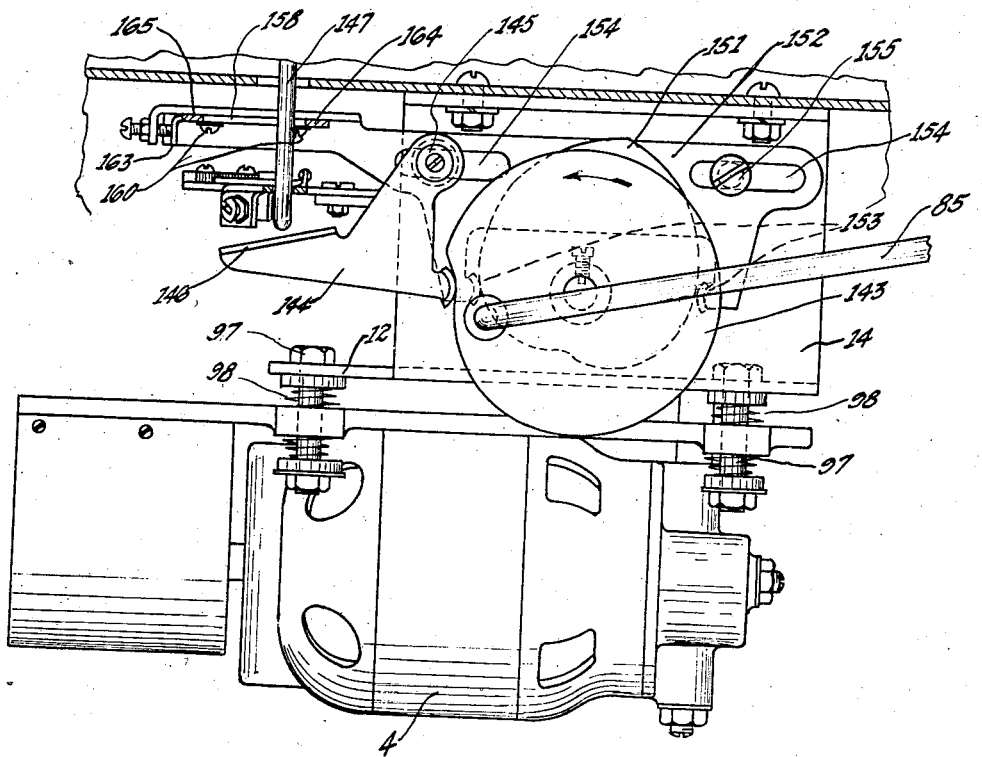
Fig. 9 is a sectional view taken on the line IX—IX of Fig. 7, but showing also the cover plate.
Figure 10:
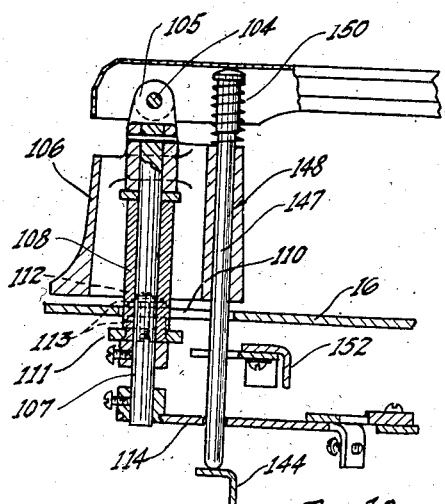
Fig. 10 is a sectional view on a line X—X of Fig. 7, the section being continued upwardly above the parts shown in Fig. 7, through the rear end of the suspension arm, a portion of the suspension arm and cover plate being broken away.
Figure 11:
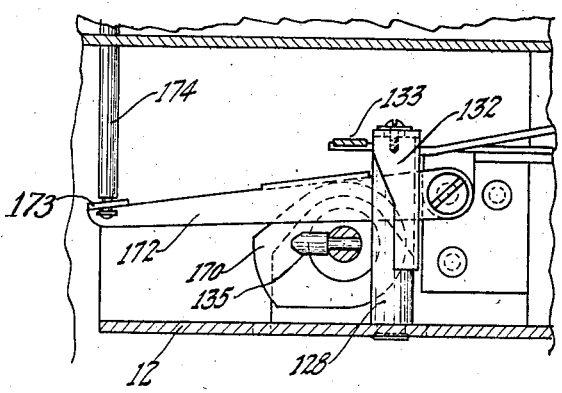
Fig. 11 is a sectional view taken along the line XI—XI of Fig. 7, parts being broken away.
Figure 12:
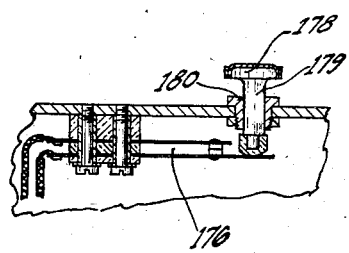
Fig. 12 is a sectional view through an automatic switch for stopping the mechanism after the last record has been played and Fig. 13 is a diagrammatic representation of the motor circuit.

After the reproducer is lowered onto the record the cam 151 reverses the movement of the slide 152 and returns it to the position shown in Fig. 9 where it is stopped owing to the interruption of the drive to shaft 88 as described.

The discharge of a record from the turn table is accomplished by the movement of a cam 170 on the shaft 88 which engages a flange 171 on a lever 172. The lever 172 which is pivoted on the bracket 120 has an apertured lug 173 on one end which receives the reduced end of a rod 174 (Figs. 1, 2, 7 and 11). The latter is slidable in and guided by an opening in the cover plate 16 and carries at its upper end a friction pad 175 which on its upward movement engages the bottom of the record on the turn table 1 thereby lifting it off the center pin 3. One end of the record engaging the periphery of the turn table then advances quickly towards the shelf 9 onto which the record falls.

Figure 13:
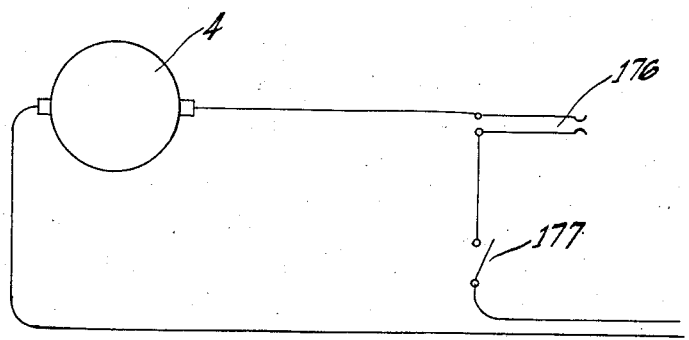

The circuit (Fig. 13) of the motor 4 includes two switches 176 and 177 in series relation. During the operation of the machine these are both closed but after the last record has been played switch 176 is opened. This is accomplished automatically by the descending reproducer which as it encounters no record on the turn table descends till the stylus engages a button 178. The button has a stem 179 which is slidable in a bearing 180 on the cover plate 16 and at its lower end engages one of the spring arms of which the switch 176 is composed. The weight of the reproducer separates the arms. The switch 177 may also be manually thrown "off" when the machine is not in use.

To start the machine the operator may lift the suspension arm 6 which thus closes switch 176 and may place a record on the turn table and close the switch 177 manually and place the reproducer on the record in the same manner as with an ordinary non-automatic phonograph.

To summarize the operation, the suspension arm moves inwardly during the playing of a record and thereafter travels further inwardly to a predetermined point or, depending on the kind of record played, reverses its movement. This moves the control member 118 which is further moved by the actuator 126 the latter throwing "in" the clutch. The clutch is held "in" for an entire cycle of operations by the arm 137 riding on the face of worm gear 92.

The cam 86 then raises the suspension arm 6 while the ejector 57 begins to feed forward another record. The cam 151 shifts the suspension arm outwardly and the cam 170 ejects the played record. The cam 135 resets the actuator 126 and the control member 118. A record drops onto the turn table and the cam 151 begins to bring the suspension arm in, while the ejector is being retracted and when the reproducer reaches the edge of the record it is lowered thereon by the cam 143.

If it should be desired to use the machine to merely "repeat" a single record this can be accomplished by detaching the link 85 from the cam 86 and removing the rod 174. Records will then not be fed from the hopper nor discharged from the turn table but the suspension arm will be lifted after the playing of the record and repositioned for replaying it.

My invention is not limited to the specific details of the embodiment illustrated and described which may be extensively modified without departing from the invention. For instance, the reproducer and suspension arm need not be of the type used for electrical phonographs but may be in the form of an acoustic sound box and tone arm. A substantial range of equivalents is contemplated within the scope of the appended claims.

I claim as my invention:

1. In a record feeding mechanism for an automatic phonograph, the combination of a carriage, an ejector lever pivoted thereon for movement up and down, a gauge comprising a pair of similar plates with a spacer therebetween, means securing said gauge for sliding movement on said lever including a pin extending through longitudinal slots in said plates, yieldable means for normally holding said gauge in extended position with respect to said lever, a catch pivoted on said pin between said plates, yieldable means for swinging said catch upwardly and forwardly and stop means for limiting the forward movement of said catch.

2. In a record feeding mechanism for an automatic phonograph, the combination of a magazine hopper for records which is provided with an opening in its bottom and is open at one side to permit the ejection of records, a carriage, means for reciprocating said carriage under said hopper, an ejecter lever, a mounting for said lever on said carriage having a pair of upstanding portions between which said lever is pivoted, said lever being movable up and down through said opening, a screw extending through said mounting and adjustable therein, said lever having one end thereof engageable with said screw for limiting the upward movement of the other end of said lever and yieldable means for elevating said latter end of said lever.

3. In a record feeding mechanism for an automatic phonograph, the combination of a magazine hopper for records which is provided with an opening in its bottom and is open at one side to permit the ejection of records, a carriage, means for reciprocating said carriage under said hopper, an ejector lever, a mounting for said lever on said carriage having a pair of upstanding portions between which said lever is pivoted, said lever being movable up and down through said opening, a screw extending through said mounting and adjustable therein, said lever having one end thereof engageable with said screw for limiting the upward movement of the other end of said lever, yieldable means for elevating said latter end of said lever, a gauge mounted for longitudinal movement on said lever, yieldable means for normally maintaining said gauge forwardly of said latter end of said lever in position to engage the lowermost record in said hopper whereby the elevation of said ejector is determined so that on its forward movement it is brought into engagement with the edge of said lowermost record for ejecting it from said hopper and means for limiting the forward movement of said gauge to prevent said gauge from projecting underneath the record at the time of its ejection.

4. In a record feeding mechanism for an automatic phonograph the combination of a magazine hopper for records which is provided with an opening in its bottom and is open on one side to permit the ejection of records, a carriage, means for reciprocating said carriage under said hopper, an ejector mounted on said carriage for movement up and down through said opening, said ejector having depending sides, pins secured to and extending from side to side of said ejector, yieldable means for raising said ejector, a gauge between said depending sides slidable on said pins, means for moving said gauge forwardly of said ejector in position to engage the lower most record in said hopper whereby the elevation of said ejector is determined so that on its forward movement it is brought into engagement with the edge of said record to eject it from said hopper and means for limiting the forward movement of said gauge to prevent said gauge from projecting underneath the record at the time of its ejection.

5. In a record feeding mechanism for automatic phonographs, the combination of a carriage, an ejector lever, a mounting on said carriage for said lever, having in cross section the shape of an inverted U, a screw adjustable through the transverse upper portion of said mounting and engageable by an end of said lever and a pair of upstanding ears on said mounting between which said lever is pivoted.

6. In a record feeding mechanism for automatic phonographs, the combination of a carriage having a hole therein, an ejector lever having in cross section the shape of an inverted U, a mounting on said carriage for said ejector also having in cross section the shape of an inverted U, a screw adjustable through the upper transverse portion of said mounting and engageable by an end of said lever and accessible through said hole for adjustment, a pair of upstanding ears on said mounting between which said lever is pivoted, a depending arm on said lever and a spring between said arm and said carriage tending to maintain said lever in elevated position.

7. In an automatic phonograph, the combination of a turn table, means for dropping records in sequence onto said turn table from a position slightly above the same and guides engageable by the sides of the records in their descent for centering them on the turn table said guides being movable to permit a record of larger diameter to be placed on the turn table.

8. In an automatic phonograph, the combination of a turn table, a horizontal member spaced below said turn table, means for dropping records in sequence onto said turn table from a position slightly above and a guide on said member engageable by the edge of the records for centering them on the turn table said guide being movable to permit a record of larger diameter to be placed on said turn table.

9. In an automatic phonograph, the combination of a turn table, means for dropping records in sequence on to said turn table from a position above and depending guides for centering said records on said turn table said guides being mounted for swinging movement upwardly to permit the positioning of a record of larger diameter on said turn table.

10. In an automatic phonograph, the combination of a turn table, a hopper having an open side, means for sliding records out of said open side of said hopper and a pair of guides mounted on the ends of said hopper and on opposite sides of said turn table for centering said records on said turn table said guides being mounted for movement out of guiding position to permit the placing of a record of larger diameter on said turn table.

11. A magazine hopper for phonograph records having a substantially flat bottom open at one side and provided with a longitudinal slot said bottom being integral with upwardly directed sides defining a receptacle for records and a reinforcing strip secured underneath said bottom and extending across said slot adjacent the open side of the hopper for strengthening said bottom.

12. The combination of a magazine hopper for phonograph records having a bottom provided with a longitudinal slot, said hopper being open at one side and having upright walls in one piece with said bottom, said hopper also having a laterally directed portion in one piece of said walls and provided with a downwardly directed reinforcing flange and a reinforcing piece secured to the lower face of said bottom and extending longitudinally of said slot and secured to said flange and projecting behind said flange, a guide supported by said reinforcing piece and means operating through said slot for ejecting records from said hopper.

13. In a phonograph, the combination of a driving shaft, means for rotating said driving shaft, a turn table on said shaft, a driven shaft, a reproducer, means supporting said reproducer for movement over said turn table in the playing of a record, an actuator, a control member engaging and preventing movement of said actuator during the playing of a record said control member being movable relative to said actuator, means operable after the playing of a record for moving said control member, yieldable means for moving said actuator relative to said control member after the movement of said control member, yieldable means operable on the movement of said actuator to couple said shafts in driving relation, means operable on the movement of said driven shaft for elevating said reproducer from the record and means for moving said actuator and said control member to the position occupied during the playing of a record, and yieldable means operable after the last mentioned movement of said actuator to discontinue the driving relation of said shafts.

14. In a phonograph, the combination of a driving shaft, means for rotating said shaft, a turn table on said shaft, a reproducer, means supporting said reproducer for movement over said turn table in the playing of a record, a driven shaft, an actuator, a control member engaging said actuator to prevent movement thereof during the playing of a record, means operable after the playing of a record to move said control member, means operable on the movement of said control member for moving said actuator, means operable on the movement of said actuator for connecting said shafts in driving relation, means operable on the movement of said driven shaft to restore said actuator and said control member to the normal position occupied in the playing of a record and means operable on a predetermined angular movement of said driven shaft thereafter for discontinuing the driving relation of said shaft.

15. In a phonograph, the combination of a turn table, a reproducer, a suspension arm for said reproducer movable about horizontal and vertical axes, a rod movable up and down for raising and lowering said suspension arm, means for guiding said rod and transmitting lateral movement thereof to said suspension arm thereby moving it about said vertical axis, means engageable with the lower portion of said rod for raising and lowering same, a slide, means for moving said slide back and forth, said slide having a portion engageable with said rod for swinging said suspension arm outwardly with respect to said turn table and a portion engageable with said rod for swinging said suspension arm inwardly to a predetermined point, said portions being spaced apart sufficiently to permit said rod to move freely therebetween throughout the entire travel of said reproducer in the playing of a record, and power means for actuating the second and third mentioned means and rotating said turn table.

16. In a phonograph, the combination of a turn table, a reproducer, a suspension arm for said reproducer movable about horizontal and vertical axes, a rod movable up and down for raising and lowering said suspension arm, means for guiding said rod and transmitting lateral movement thereof to said suspension arm thereby moving it about said vertical axis, a lever engageable with the lower portion of said rod for raising and lowering same, a cam for moving said lever back and forth, a slide, a cam for moving said slide back and forth, said slide having a portion engageable with said rod for swinging said suspension arm outwardly with respect to said turn table and a portion engageable with said rod for swinging said suspension arm inwardly to a predetermined point, said portions being spaced apart sufficiently to permit said rod to move freely therebetween throughout the entire travel of said reproducer in the playing of a record, a common horizontal shaft for said cams, and power means for rotating said shaft and said turn table.

17. In a phonograph, the combination of a suspension arm mounted for movement about vertical and horizontal axes, means for supporting a reproducer on said arm, a driving shaft, a turn table on said shaft, means for rotating said shaft, a horizontal driven shaft, a support having a bearing thereon for said driven shaft, a cam on said driven shaft, means operable by said cam for raising and lowering said suspension arm, a second cam on said driven shaft, a slide having a pair of slots therein, a pair of studs on said support extending through said slots for guiding said slide, and means operable on the rotation of said second cam to move said slide in one direction after the raising of said suspension arm and to impart a reverse movement of said suspension arm prior to the lowering of said suspension arm by the first mentioned cam.

18. In a phonograph, the combination of a turn table, a reproducer having a stylus, a suspension arm mounted for movement about vertical and horizontal axes, means for supporting said reproducer on said arm, a member mounted for movement with said arm about said horizontal axis and also mounted for movement up and down, means operable by such movement of said member to raise and lower said suspension arm, yieldable means operable on the depositing of the stylus on the smooth exterior portion of a record to draw said stylus into the sound groove, a second member having a face engageable with the first mentioned member for raising and lowering the same, means operable after the playing of a record to move the second member and raise said suspension arm and means for swinging said suspension arm outwardly with respect to said turn table, the third mentioned means being operable after said swinging movement to lower said suspension arm, the face of said second mentioned member being disposed at such angles during the lowering of said suspension arm as by its friction to prevent lateral movement of the first mentioned member and said reproducer until the stylus engages the record.

19. In a phonograph, the combination of a suspension arm mounted for movement about vertical and horizontal axes, means for supporting a reproducer on said arm, a horizontal shaft, means for driving said shaft, a cam member on said shaft, a lever engaging said cam member, means operable on the movement of said lever by said cam member for raising and lowering said suspension arm, a link pivotally connected eccentrically on said cam member, and means operable by the movement of said link to place a record on said turn table after the elevation of said suspension arm.

20. In a phonograph, a combination of a driving shaft, a turn table thereon, a magazine, means automatically operable after the playing of a record to drop a record from said magazine, means including a guide for directing the falling record onto said turn table, said guide being mounted for manual movement away from said turn table to permit a record of larger diameter to be placed thereon, and means operative on the manual movement of said guide to render the first mentioned means inoperative, thereby preventing the automatic placing of an additional record on said turn table.

GROVER O. WARDROP.